United States Patent [19]

Morel

[11] 4,368,999
[45] Jan. 18, 1983

[54] COUPLING OR CONNECTING END PART FOR FLEXIBLE ELEMENTS SUCH AS CABLES, WIRES OR OTHER ELEMENTS

[75] Inventor: Henri Morel, Maule, France

[73] Assignee: ITW deFrance, Beauchamp, France

[21] Appl. No.: 156,976

[22] Filed: Jun. 6, 1980

[30] Foreign Application Priority Data

Jun. 13, 1979 [FR] France .................... 79 15135

[51] Int. Cl.³ .............................................. F16B 2/10
[52] U.S. Cl. .................................... 403/283; 24/260
[58] Field of Search ............. 403/283; 24/260, 136 R

[56] References Cited

U.S. PATENT DOCUMENTS

| 720,735 | 2/1903 | Peelle | 403/283 |
| 1,036,679 | 8/1912 | Mongardi | 403/283 |
| 1,110,579 | 9/1914 | Seeber | 24/260 |
| 4,205,417 | 6/1980 | Mackal | 24/260 |

Primary Examiner—Andrew V. Kundrat
Attorney, Agent, or Firm—Jerold M. Forsberg; Thomas W. Buckman

[57] ABSTRACT

The invention relates to a coupling or connecting end part for a flexible element such as a cable, wire or other element, whatever the cross-section thereof. In accordance with the invention, the part is formed from two separate portions forming a whole with the flexible element when assembly is completed. The first portion is a cage receiving the flexible element and includes laterally at least one extending flexible strip normally projecting outside of the cage. A second portion being a slider being adapted to be slid over said cage, in order to urge said strip inwardly, so that a portion of the strip is embedded in the flexible element. The device has means provided to produce effective locking of the slider on the cage. The invention is applied to the fastening of parts on flexible elements such as cables, wires or other elements.

12 Claims, 5 Drawing Figures

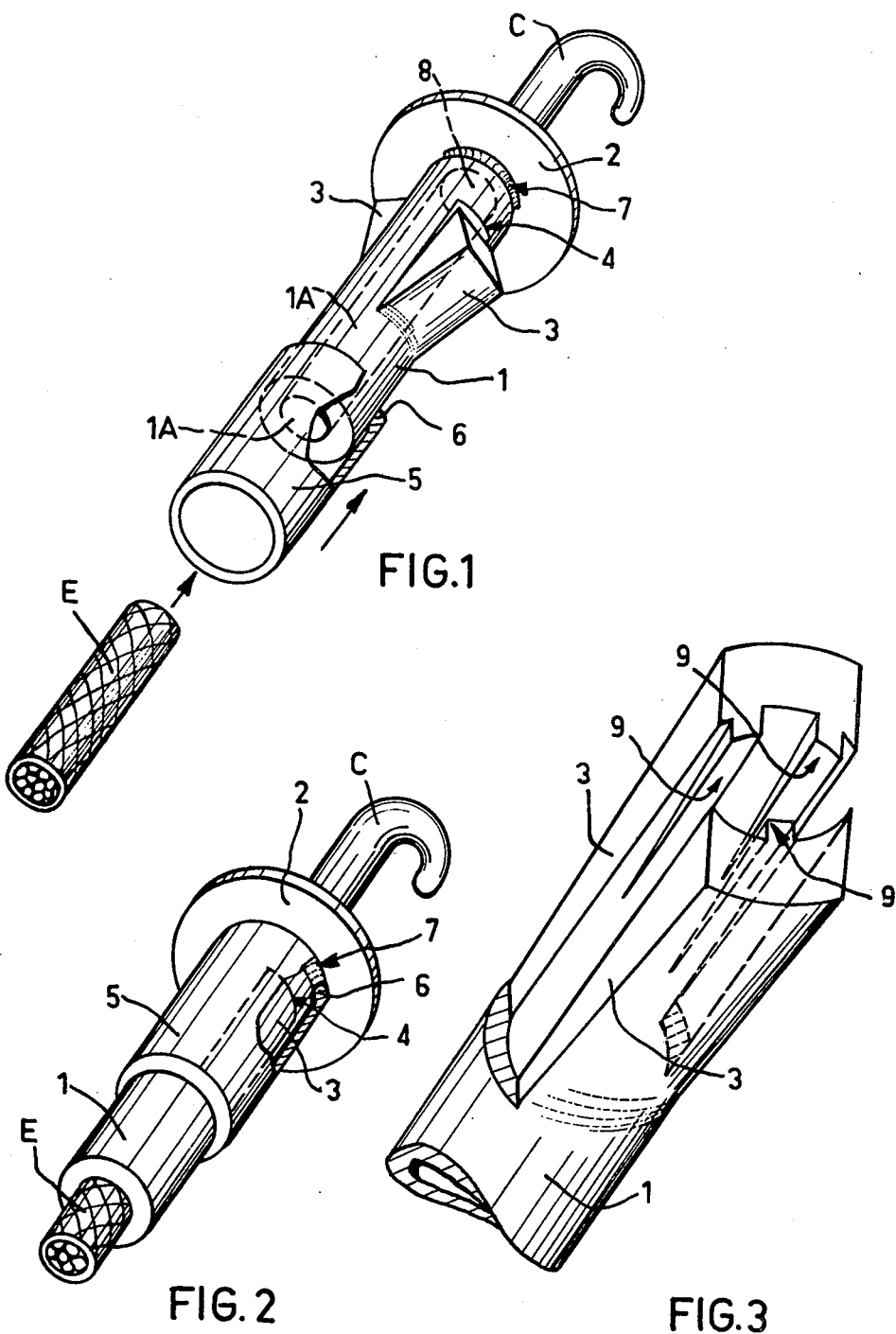

COUPLING OR CONNECTING END PART FOR FLEXIBLE ELEMENTS SUCH AS CABLES, WIRES OR OTHER ELEMENTS

BACKGROUND AND GENERAL DESCRIPTION OF THE INVENTION

The present invention relates to a coupling or connecting end part for flexible elements such as cables, wires or other elements, whatever the cross-section thereof. The improvement disclosed herein as directed to coupling or connecting end parts for flexible elements which are at the same time simple to make, reliable and easily mounted and which are very often required in the assembly of automobiles.

It is an object of the present invention to provide a part responding to these three criteria.

According to the invention, there is provided a part for flexible elements such as cables, wires or other elements, characterised in that it is formed of two separate portions which when assembled with the flexible element forms a unitary device.

The device includes, generally, a cage adapted to receive the flexible element and including at least one flexible strip normally projecting laterally outside of the cage; and a slider adapted to be slid over said cage in order to urge said flexible strip back inwardly so that the strip engages and a portion thereof becoming embedded in the flexible element.

A locking means is provided on said slider and said cage to obtain an effective locking of the slider on the cage. Once the assembly of the device of this invention has been made with the flexible element, they are then essentially a unitary device in that the device of this invention is permanently attached thereto.

Each flexible strip may have at least one inwardly directed retaining spline designed to be embedded in the flexible element.

The slider and the cage have complementary locking means which according to one embodiment, may include an annular step on the slider projecting inwardly and a groove formed on the cage.

Other features and advantages of the present invention will emerge from the description which follows given with reference to the accompanying drawings.

BRIEF DESCRIPTION OF THE DRAWINGS

In the drawings:

FIG. 1 is a perspective view, in partial section, of one embodiment according to the invention, before assembly and before receiving the flexible element;

FIG. 2 is a perspective view of the device depicted in FIG. 1 in partial section after assembly of the device on the end the flexible element;

FIG. 3 is a detailed view on a larger scale, in partial section, of an embodiment of the flexible strips of a cage according to the invention.

DESCRIPTION OF PREFERRED EMBODIMENTS

Figure 4:
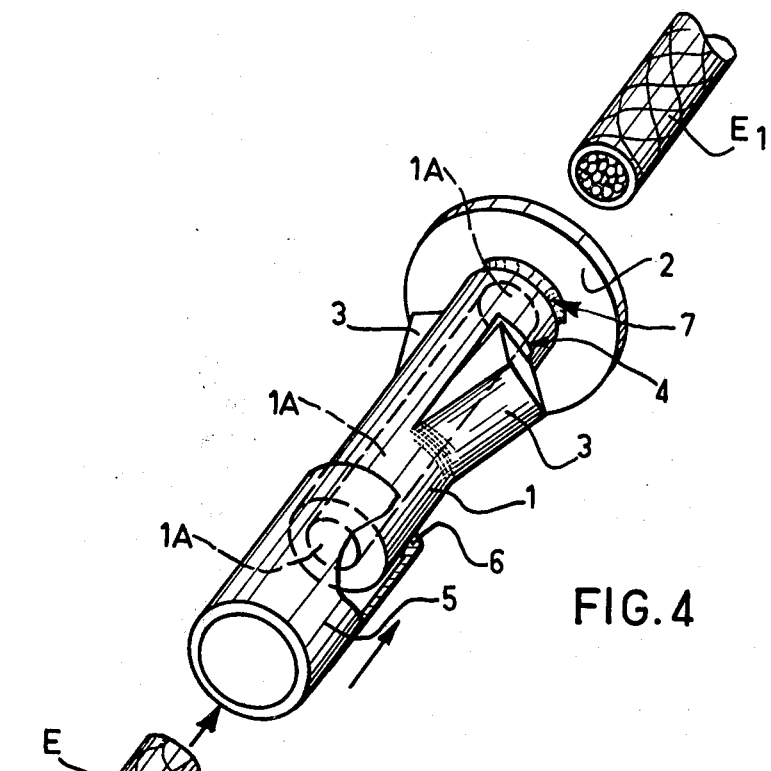
FIG. 4 is a perspective view, in partial section, of another embodiment, according to the invention, having an open bore therethrough, the device being shown before mounting on the flexible elements.

There are two embodiments of the instant invention shown in the Figures. The first embodiment is depicted by FIG. 1 and the second embodiment is depicted by FIG. 4. The part, according to the invention, is for attachment to the ends of flexible elements such as cables, wires or other elements and includes two separate portions which form a unitary part with the flexible element when mounting is completed. Throughout the Figures like numerals have been used to designate similar structure.

As seen in the drawings the invention includes a cylindrical cage 1 having, at one end, a laterally extending flange 2, flexible strips 3 each projecting laterally from the sides of the cage through a window or slot 4 formed in the cage.

The complementary cylindrical ring or slider 5 is slidable over the cylindrical cage 1, as shown in FIG. 2, and includes an annular step 6 projecting inwardly.

The annular step 6 is at the end of sliding the ring 5 and extends inwardly so as to be engageable in a corresponding groove 7 formed in the cage 4 at its junction with the base 2. It is self-evident that the step 6 and the groove 7 may be reversed (step on the cage and groove on the slider) and may be formed so that their engagement takes place at any other point between the end of the slots 4, opposite their attachment to the strips 3, and the surface of the base 2. The engagement of the step and of the groove may also take place at any point between the attachment of the strips to the cage and the other end of the cage.

In FIGS. 1, 2 and 4, 5, the flexible projecting strips 3 have at their base, i.e., where they are attached to the cage, the same thickness as the cage 1 of which they form, in their relaxed condition, an extension projecting outwardly. at the distal end of each flexible strip the thickness is slightly greater than that of the cage so as to become embedded in the flexible element E when the latter is introduced into the cage 1 and the strips 3 are folded into the slots 4 under the action of the sliding ring 5. The general appearance of each flexible strip 3 is hence prismatic with a slope directed towards the end of the cage opposite that having the base 2.

The depth to which the ends of the flexible strips are embedded is more or less according to the force that the part must withstand. Thus, the thickness at the distal end of each of the flexible strips can be predetermined to assure that the part will not be stripped off the end of the flexible element.

In order to ensure better locking of the element E in the part, the flexible strips 3 may include, on their inner surface, retaining splines 9. These splines are more or less deeply embedded in the flexible element to be fixed, when the flexible strips are folded inwardly into the cage by the sliding ring 5.

Splines 9, as best seen in FIG. 3, are of a generally prismatic appearance with a slope directed towards one end of the cage. Thus it can be seen that the splines 9 have a tapered configuration and that the distal end may be of a predetermined thickness to regulate the embeddment within the flexible element. As seen in FIG. 3, a pair of flexible strips are depicted with a single spline on one of the strips and two splines on the other strip. In all the embodiments shown, the cage includes two slots 4 diametrically opposite with which are associated two flexible projecting strips 3 but it is of course understood that a greater number of slots and corresponding strips may be provided, notably according to the size of the part.

In the embodiment shown in FIGS. 1 and 2, the bore 1A of the cage 1 is blind. It constitutes a stop 8 to arrest the insertion of an element E into the cage and the part according to the invention constitutes, in this case, an end part.

Figure 5:
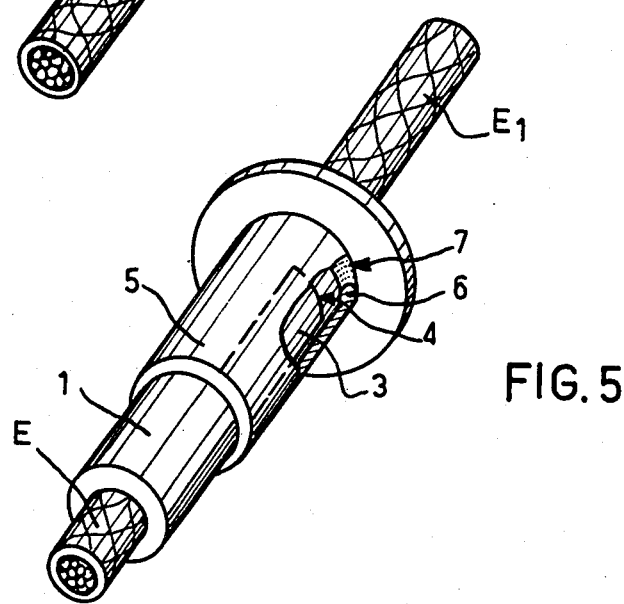
FIG. 5 is a perspective view, in partial section, of the embodiment of FIG. 4, after assembly of the device relative to the ends of the two flexible elements.

In the embodiment shown in FIGS. 4 and 5, the bore 1A of the cage 1 is open of both ends so that the part according to the invention may be used at any point in the length of a flexible element E or again it may serve for connecting two flexible element portions E and E1 provided that the part is given two symmetrical retaining systems.

In the embodiment of FIGS. 1 and 2, the base 2 provides for any additional function, e.g., due to an accessory which is to be attached to it like a hook C.

The principle of use for the device of the instant invention is as follows:

The part, in its relaxed or open condition, according to the invention, is inserted onto an end of a flexible element to be fixed (of circular section in the drawings but which may be of any polygonal shape). The element passes between the laterally projecting strips 3 of the cage 1 and is blocked by butting against the stop 8 (the inside of the cage 1 is complementary with the shape of the element to be fixed). The retention of the device on the flexible element is effected by movement of the sliding ring 5 towards the base 2. When the ring is slid over the flexible strips 3 it forces them inwardly within the cage 1 through the slots 4.

The retaining splines 9 borne by the flexible strips 3 dig into the flexible element to be fixed, more or less deeply according to the retention force required. The sliding ring 5 must be moved until the step 6 comes into the groove 7 designed to lock the ring relative to the cage. For low retaining requirements, the sliding of the sliding ring 5 to retract the flexible strips 3 may be effected manually. For stronger requirements a tool such as a pincers, may be provided.

The retaining splines are designed so as to ensure best possible retention of the part on the flexible element E. A good solution corresponds to the arrangement of the splines 9, as shown, without this choice being however limiting in any way.

Mounting of the device of the instant invention on a flexible element is done therefore with great facility.

The end part according to the invention is entirely formed (cage and slider) of a supple and flexible material, a plastics material for example, injectable in a single injection.

Beside these advantages, the invention introduces a reliability which can be designed to resist forces, over a wide range, which tend to tear the device off the end of the flexible member.

It is of course understood that the present invention has only been described and illustrated by way of preferred example and that equivalents could be introduced into the constituent elements without, however, departing from the scope of the invention.

I claim:

1. A device adapted to be attached to an elongated flexible article having a predetermined cross sectional configuration comprising a first member adapted to receive an end of the elongated flexible article and a second member adapted to circumscribe the first member and slide relative thereto; said first member including a portion completely circumscribing said article and having a bore substantially conforming in cross sectional configuration to the cross sectional configuration of the article, said first member having at least one lateral opening therein and an integrally formed flexible locking means adapted to have a portion thereof extend through said at least one opening into said bore, said portion of said locking means having a thickness greater than the thickness of said first member in the area of said at least one opening and means on said portion of said locking means projecting inwardly towards said bore for engaging and resisting axial movement of said article relative to the longitudinal axis of said bore, latching means for securing said first member relative to said second member when it has been slid axially over said at least one opening, whereby when said second member is slid over said first member to the latched position the flexible locking means, along with inwardly projecting means, are flexed through said at least one opening by said second member into engagement with the elongated article to thereby engage and resist axial movement of the article relative to the device by embeddment of a portion of the distal end of said locking means in said elongated article.

2. The device according to claim 1 wherein each of said locking means is of a generally prismatic shape with a slope directed towards where the locking means is integrally formed with said first member.

3. The device according to claim 1 wherein said locking means has at least one retaining spline designed to dig into said elongated article.

4. The device according to claim 1 wherein each of said locking means has at least one retaining spline designed to dig into said flexible element, said spline being of a generally prismatic shape with a slope directed away from the distal end of said locking means.

5. The device according to claim 1 where said at least one opening includes two openings and each of said openings has a locking means adapted to extend through said opening and engage said elongated article.

6. The device according to claim 1 wherein said bore formed in said first member is open through the entire length of said first member whence it is possible to fix said device at any point along the length of said elongated article and in the alternative may interconnect the ends of two different elongated articles.

7. The device according to claim 1 wherein said bore formed in said first member is blind and has a bottom which constitutes an insertion stop for said elongated article.

8. The device according to claim 1 wherein one end of said first member is adapted to support any accessory.

9. The device according to claim 1 wherein said latching means for said second means is formed so that the engagement occurs at any point between the end of said locking means opposite their attachment to said first member and one end of said first member.

10. The device according to claim 1 wherein said latching means includes an annular step and a corresponding groove.

11. The device according to claim 1 wherein said latching means includes an annular step projecting inwardly and complementary groove means.

12. The device according to claim 1 formed entirely of a supple and flexible material by injection molding.

* * * * *